(12) United States Patent
Cuevas et al.

(10) Patent No.: US 6,322,100 B1
(45) Date of Patent: *Nov. 27, 2001

(54) DEPLOYMENT STRUCTURE FOR AN INFLATABLE VEHICLE OCCUPANT PROTECTION DEVICE

(75) Inventors: Jess A. Cuevas, Scottsdale; Ahmad K. Al-Amin, Higley; Timothy A. Swann, Mesa; Roy D. Van Wynsberghe, Mesa; Bryan W. Shirk, Mesa, all of AZ (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,805

(22) Filed: Oct. 26, 1998

(51) Int. Cl.⁷ .................................................. B60R 21/20
(52) U.S. Cl. ..................................... 280/728.3; 280/728.2
(58) Field of Search .............................. 280/728.3, 728.2, 280/731, 732

(56) References Cited

U.S. PATENT DOCUMENTS

| 5,062,661 | 11/1991 | Winget . | |
|---|---|---|---|
| 5,294,147 | * 3/1994 | Edge | 280/728.3 |
| 5,487,557 | * 1/1996 | Eckhout | 280/728.3 |
| 5,516,143 | * 5/1996 | Lang et al. | 280/731 |
| 5,529,336 | 6/1996 | Eckhout . | |
| 5,542,694 | * 8/1996 | Davis | 280/731 |
| 5,573,268 | * 11/1996 | Leonelli | 280/731 |
| 5,678,851 | * 10/1997 | Saito et al. | 280/728.3 |
| 5,685,056 | 11/1997 | Fischer . | |
| 5,775,721 | * 7/1998 | Grout | 280/728.3 |
| 5,947,511 | * 9/1999 | Usui et al. | 280/728.3 |

FOREIGN PATENT DOCUMENTS 5139231    6/1993    (JP) .

* cited by examiner

*Primary Examiner*—Douglas Hess
*Assistant Examiner*—Elaine Gort
(74) *Attorney, Agent, or Firm*—Tarolli, Sundheim, Covell, Tummino & Szabo L.L.P.

(57) ABSTRACT

A vehicle occupant protection apparatus (10) includes a pivotal deployment door (82) and a decorative emblem structure (52) having an installed position on the deployment door (82). The deployment door (82) is configured to open under the influence of inflation fluid pressure forces applied by an inflatable vehicle occupant protection device (14). The apparatus (10) further includes a first fastener structure (110) on the deployment door (82) and a second fastener structure (114) on the emblem structure (52). The fastener structures (110, 114) are configured to snap together to establish a mechanical interlock between the deployment door (82) and the emblem structure (52) upon movement of the emblem structure (52) to the installed position on the deployment door (82).

3 Claims, 2 Drawing Sheets

US 6,322,100 B1

DEPLOYMENT STRUCTURE FOR AN INFLATABLE VEHICLE OCCUPANT PROTECTION DEVICE

FIELD OF THE INVENTION

The present invention relates to an inflatable vehicle occupant protection device, and particularly relates to a deployment structure for covering the protection device in a vehicle.

BACKGROUND OF THE INVENTION

An inflatable vehicle occupant protection device, such as an air bag, is inflated when a vehicle experiences a crash. Inflation fluid is directed to flow from an inflator into the air bag to inflate the air bag. When the air bag is inflated, it extends into the vehicle occupant compartment to help protect an occupant of the vehicle from a forceful impact with parts of the vehicle as a result of the crash.

A deployment structure conceals the air bag and the inflator from view in the vehicle occupant compartment. The deployment structure includes one or more pivotal deployment doors which extend over the air bag. As the inflation fluid begins to flow from the inflator into the air bag, it moves the air bag against the deployment structure. The deployment doors are opened by the air bag as the inflation fluid continues to inflate the air bag into the vehicle occupant compartment. A decorative emblem may be mounted on one of the deployment doors.

SUMMARY OF THE INVENTION

In accordance with the present invention, an apparatus comprises a pivotal deployment door and a decorative emblem structure having an installed position on the deployment door. The deployment door is configured to open under the influence of inflation fluid pressure forces applied by an inflatable vehicle occupant protection device. The apparatus further comprises a first fastener structure on the deployment door and a second fastener structure on the emblem structure. The fastener structures are configured to snap together to establish a mechanical interlock between the deployment door and the emblem structure upon movement of the emblem structure to the installed position on the deployment door.

BRIEF DESCRIPTION OF THE DRAWINGS

The foregoing and other features of the present invention will become apparent to one skilled in the art to which the present invention relates upon reading the following description of the invention with reference to the accompanying drawings, wherein.

DESCRIPTION OF PREFERRED EMBODIMENTS

Figure 1:
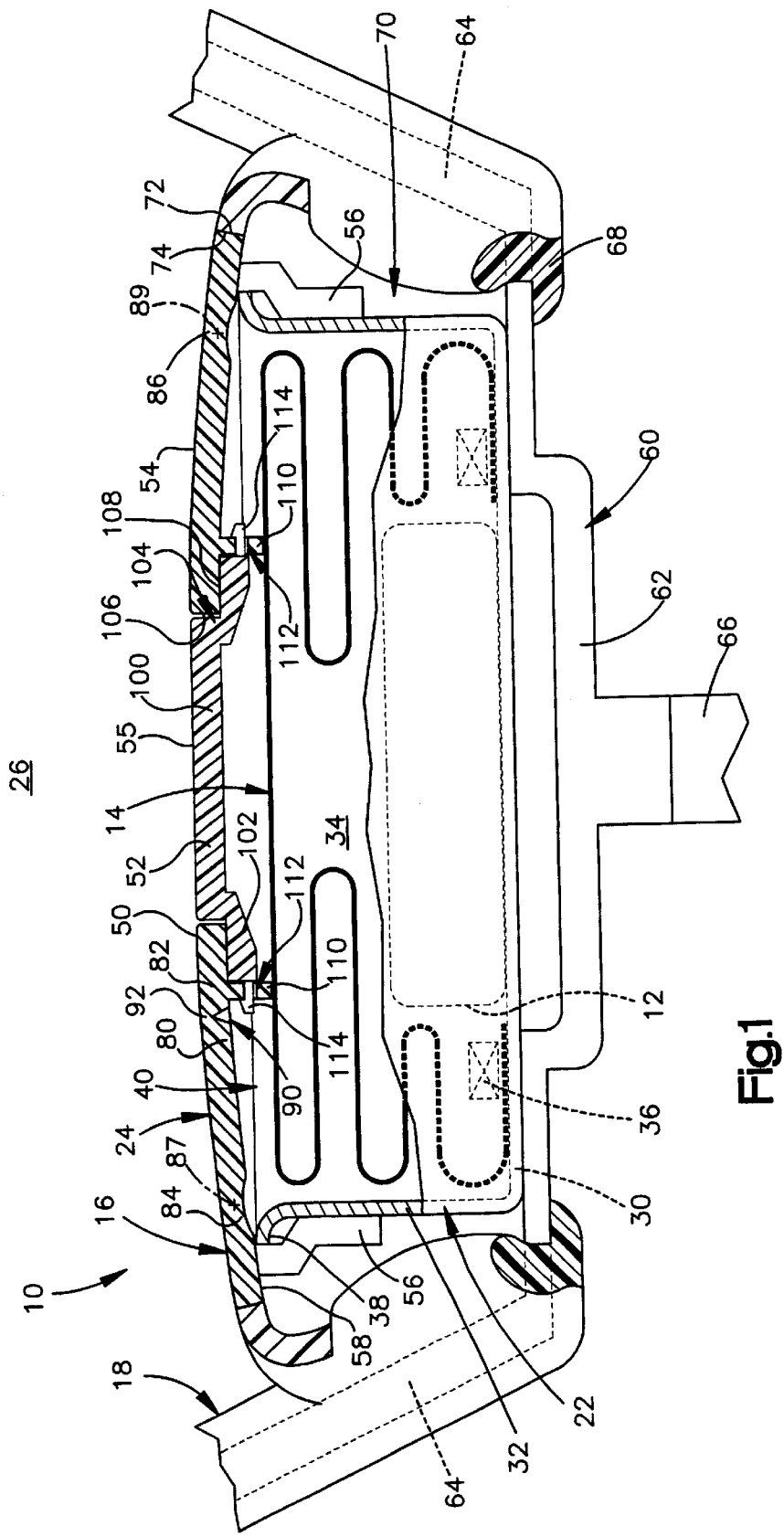
FIG. 1 is a side view, partly in section, of an apparatus comprising a first embodiment of the present invention.

An apparatus 10 comprising a first embodiment of the present invention is shown in FIG. 1. The apparatus 10 includes an inflator 12 and an inflatable vehicle occupant protection device 14 which is commonly referred to as an air bag. In the first embodiment of the invention, air bag 14 and the inflator 12 are parts of an air bag module 16 which is mounted on a vehicle steering wheel 18.

The module 16 is an assembly of parts that are interconnected separately from the steering wheel 18. In addition to the air bag 14 and the inflator 12, such parts include a reaction structure 22 which contains the air bag 14 and the inflator 12, and a deployment structure 24 which conceals the air bag 14 and the other parts of the module 16 from view in the vehicle occupant compartment 26. When the air bag 14 is inflated, it extends into the vehicle occupant compartment 26 between the steering wheel 18 and the driver of the vehicle to help restrain movement of the driver toward the steering wheel 18.

The inflator 12 is a known device containing a source of inflation fluid for inflating the air bag 14. The inflator 12 may thus contain pressurized inflation fluid, a body of ignitable gas-generating material, or a combination of pressurized inflation fluid and ignitable material for heating the inflation fluid. The ignitable material may comprise a fuel gas or a combustible mixture of gases, as known in the art. As further known in the art, the inflator 12 is actuated upon the occurrence of a vehicle crash having at least a specified threshold level of severity for which inflation of the air bag 14 is desired to help restrain the driver. The inflation fluid then flows rapidly from the inflator 12 into the air bag 14 to inflate and deploy the air bag 14 outward from the steering wheel 18 toward the driver.

The air bag 14 may be constructed of one or more panels of any suitable material known in the art, including woven materials and plastic films. The panels of air bag material are interconnected along seams that are formed by stitches, ultrasonic welds, adhesives, heat staking, or the like, depending on the particular air bag material of which the panels are formed. Preferably, the air bag 14 is constructed of panels formed of a nylon fabric which is coated with silicone. Any suitable arrangement of folds can be used to place the air bag 14 in the folded, uninflated condition in which it is shown schematically in FIG. 1.

The reaction structure 22 includes a reaction plate 30 and a frame 32. The frame 32 extends about the periphery of the reaction plate 30, and projects upward (as viewed in FIG. 1) to define the depth and peripheral boundaries of a storage compartment 34 in which the inflator 12 and the folded air bag 14 are received. A retainer assembly 36 (shown schematically) interconnects the inflator 12, the air bag 14, and the reaction plate 30 in a known manner. A rim portion 38 of the frame 32 defines a deployment opening 40 through which the air bag 14 emerges from the storage compartment 34 upon being inflated into the vehicle occupant compartment 26.

The deployment structure 24 in the first embodiment of the present invention includes a panel structure 50 and a decorative emblem structure 52. The panel structure 50 extends across the deployment opening 40 and projects beyond the rim 38 of the frame 32 fully about the periphery of the frame 32. An outer side surface 54 of the panel structure 50 is a Class-A surface, i.e., a trim surface that is visible in the vehicle occupant compartment 26. An outer side surface 55 of the emblem structure 52 also is a Class-A surface. A pair of mounting portions 56 of the deployment structure 24 project from an inner side surface 58 of the panel structure 50. The mounting portions 56 are interconnected with the reaction structure 22 in a known manner, such as by the use of fasteners (not shown).

As shown by way of example, the steering wheel 18 has an armature 60 with distinct portions including a hub 62, a circular rim (not shown), and a plurality of spokes 64 projecting from the hub 62 to the rim. The hub 62 is mounted on an input shaft 66 in a vehicle steering column. A molded plastic cover 68 on the armature 60 encapsulates the spokes 64 and the rim. The module 16 is received within a cavity 70 defined by the cover 68, and is fixed to the armature 60 in a known manner. A peripheral edge surface 72 of the panel structure 50 fits closely against a surrounding inner edge surface 74 of the cover 68.

The panel structure 50 includes first and second deployment doors 80 and 82. A corresponding pair of relatively thin portions 84 and 86 of the panel structure 50 are configured as hinges. The hinges 84 and 86 define pivotal axes 87 and 89 for the deployment doors 80 and 82, respectively.

A notch 90 at the inner side surface 58 of the panel structure 50 is elongated in a generally H-shaped configuration. The notch 90 thus extends along three sides of the first deployment door 80 between opposite ends of the first hinge 84. The notch 90 further extends along three sides of the second deployment door 82 between opposite ends of the second hinge 86. A thinned section 92 of the panel structure 50 is located between the notch 90 and the outer side surface 54. The thinned section 92 is elongated coextensively with the notch 92 so as to define a stress riser which likewise extends along three sides of each of the deployment doors 80 and 82.

As inflation fluid begins to flow from the inflator 12 into the air bag 14, it causes the air bag 14 to apply fluid pressure forces outwardly against the deployment doors 80 and 82. The stress riser 92 ruptures under the stress induced by the fluid pressure forces. The deployment doors 80 and 82 are then moved pivotally open by the air bag 14 as the inflation fluid continues to inflate and deploy the air bag 14 outward from the storage chamber 34 and into the vehicle occupant compartment 26.

In accordance with the present invention, the deployment structure 24 is configured to prevent the emblem structure 52 from being dislodged under the influence of the inflation fluid pressure forces applied by the inflating air bag 14. Specifically, the Class-A surface 55 on the emblem structure 52 is defined by a decorative portion 100 of the emblem structure 52. The decorative portion 100 of the emblem structure 52 projects from a base portion 102, and is received through an opening 104 defined by an inner edge surface 106 of the second deployment door 82. The base portion 102 of the emblem structure 52 is configured as a flange projecting from the decorative portion 100 fully about the periphery of the decorative portion 100. An outer side surface 108 of the base portion 102 abuts the inner side surface 58 of the panel structure 56 fully about the periphery of the opening 104 in the second deployment door 82.

A plurality of mounting bosses 110, two of which are shown in FIG. 1, project from the inner side surface 58 of the panel structure 50 at the second deployment door 82. Each mounting boss 110 has at least one slot 112. A plurality of locking tabs 114 on the emblem structure 52 project laterally from the periphery of the base portion 102. The locking tabs 114 extend through the slots 112. The locking tabs 114 are configured to snap into interlocked engagement with the mounting bosses 110, and thereby to interlock the emblem structure 52 with the second deployment door 82, upon being received through the slots 112. In accordance with this feature of the present invention, the panel structure 50 and/or the emblem structure 52 is formed of a molded plastic material. The plastic material is flexible enough to enable the locking tabs 114 to be received through the slots 112 upon movement of the emblem structure 52 to the installed position in which it is shown in FIG. 1.

Figure 2:
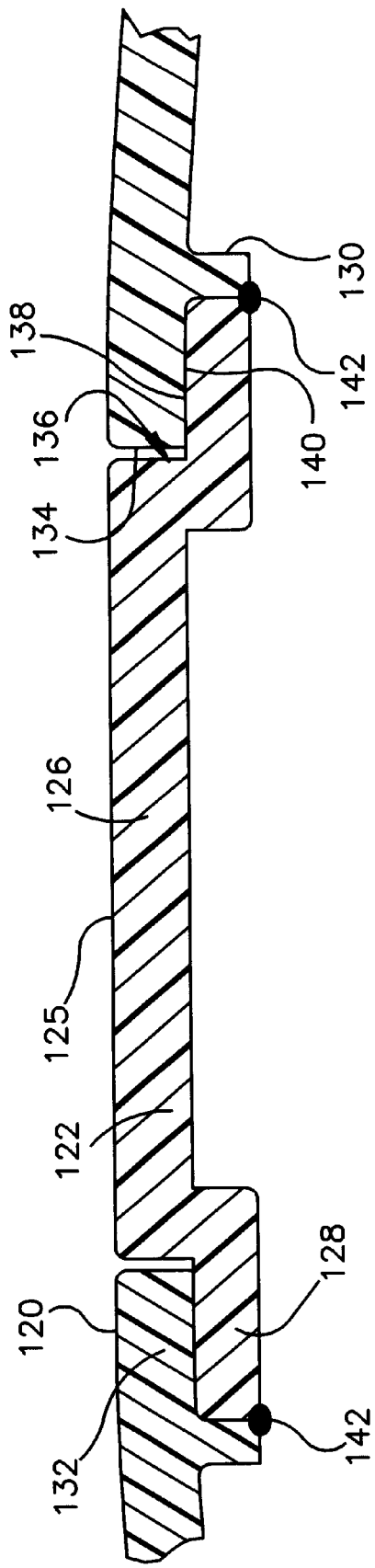
FIG. 2 is a side view, partly in section, of parts of an apparatus comprising a second embodiment of the present invention.

Parts of a second embodiment of the present invention are shown in FIG. 2. The second embodiment includes a panel structure 120 and an emblem structure 122 in place of the panel structure 50 and the emblem structure 52 in the first embodiment.

The emblem structure 122 in the second embodiment does not have locking tabs, but is otherwise substantially the same as the emblem structure 52 in the first embodiment. The emblem structure 122 thus has a Class-A surface 125 on a decorative portion 126 which projects from a flange-like base portion 128 and is symmetric about a vertical axis 165. The base portion 128 has a uniform and continuous lower surface 129 (i.e., no holes).

The panel structure 120 in the second embodiment has only a single mounting boss 130 with an inner, annular surface (3), but is otherwise substantially the same as the panel structure 50 in the first embodiment. The mounting boss 130 projects axially downward from the inner side surface 140 of the deployment door 132. The panel structure 120 thus includes a deployment door 132 with an inner edge surface 134 defining an opening 136 for the decorative portion 126 of the emblem structure 122. An outer side surface 138 of the base portion 128 abuts an inner side surface 140 of the deployment door 132 entirely around the opening 136. The inner, annular surface 131 of the mounting boss 130 and the inner side surface 140 of the deployment door 132 together define a securement recess 155 for receiving the emblem structure 122 and securing the emblem structure both axially and radially.

Preferably, the mounting boss 130 adjoins the emblem structure 122 continuously and fully about the periphery of the base portion 128 of the emblem structure 122. The mounting boss 130 and the emblem structure 122 are interconnected by heat-staking at the juncture of the mounting boss 130 and the base portion 128. Such heat-staking could be provided at locations 142 that are spaced apart about the periphery of the base portion 128, as shown in FIG. 2, or continuously and fully about the periphery of the base portion 128.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a pivotal deployment door which is configured to open under the influence of inflation fluid pressure forces applied by an inflatable vehicle occupant protection device, said deployment door having an inner edge surface defining an opening extending through said deployment door, a part of said deployment door defining a mounting boss extending away from said inner edge surface and forming a securement recess; and a decorative emblem structure having an axis of symmetry, a base extending radially outward from said emblem structure, and a decorative portion projecting axially from said base, said decorative portion extending through said opening and having a Class-A surface, said base having an outer perimeter with an outer side surface abutting an inner side surface of said mounting boss, said base having a uniform and continuous lower surface and being secured both axially and radially within said securement recess of said deployment door by said mounting boss, said mounting boss of said deployment door and said base of said emblem structure having portions that are fixed together by heat-staked welds such that said emblem structure moves with said deployment door as said deployment door moves from a closed position to an open position, said mounting boss of said deployment door projecting axially downward from said inner side surface of said deployment door and surrounding said outer perimeter said base, said mounting boss further adjoining said emblem structure fully and continuously about said outer perimeter of said base.

2. Apparatus as defined in claim 1 wherein said heat-staked welds comprise adjoining portions of said mounting boss and said base.

3. Apparatus as defined in claim 2 wherein said mounting boss and said base are heat-staked together continuously around said mounting boss.

\* \* \* \* \*